United States Patent [19]
Philipp et al.

[11] Patent Number: 5,364,447
[45] Date of Patent: * Nov. 15, 1994

[54] METHOD OF RECYCLING HAZARDOUS WASTE

[75] Inventors: Carl T. Philipp, Hot Springs; Bobby H. Sims, Lonsdale, both of Ark.

[73] Assignee: Enviroscience, Inc., Hot Springs, Ark.

[*] Notice: The portion of the term of this patent subsequent to Mar. 30, 2010 has been disclaimed.

[21] Appl. No.: 38,464

[22] Filed: Mar. 29, 1993

Related U.S. Application Data

[63] Continuation-in-part of Ser. No. 632,000, Dec. 21, 1990, Pat. No. 5,198,190.

[51] Int. Cl.⁵ ............................................. C21B 11/00
[52] U.S. Cl. ..................................... 75/500; 75/503; 75/586; 75/623; 75/629; 75/658; 75/669; 75/695; 75/958; 588/234
[58] Field of Search ............... 75/500, 623, 641, 629, 75/658, 695, 586, 958, 503, 669; 588/234, 236, 237

[56] References Cited

U.S. PATENT DOCUMENTS

| | | | |
|---|---|---|---|
| 4,213,779 | 7/1980 | Caswell | 75/770 |
| 4,673,431 | 6/1987 | Bricmont | 75/695 |
| 5,198,190 | 3/1993 | Philipp et al. | 420/582 |

*Primary Examiner*—Melvyn J. Andrews
*Attorney, Agent, or Firm*—Stephen D. Carver; Trent C. Keisling

[57] ABSTRACT

A smelting process for blending hazardous and non-hazardous inorganic industrial wastes with carbon or aluminum reducing agents to simultaneously recover metal alloys (reducible metals), metal oxides (volatile reducible metals), carbon dioxide and man-made vitreous fiber (non reducible metals). Wastes including hazardous wastes of U.S. EPA Series D, F, P, K, and U are pulverized and blended with liquids such as water or waste water to produce a homogeneous mass. The mass is formed into briquettes and melted in a cupola or plasma arc furnace in the presence of carbon or aluminum to reduce metals. Other types of furnaces such as an electric arc furnace may be used to avoid the steps of forming and curing briquettes. Reduction is carried out at temperatures between 1660 and 3100 degrees Fahrenheit. Calcium flux from calcium-stabilized wastes enhances mineral wool quality, lowers the sulfur content of metals and raises pH to facilitate metal reduction. Reducible metals are reduced and drawn off into molds. Substantial purity is obtained in the recovered reducible metals. Volatile metals are volatilized and reclaimed in the air pollution control system. Remaining slags mainly comprising oxides of non-reducible metals are used to produce mineral wool. Heavy solids and unspun shot particles are recycled into the system to eliminate waste.

20 Claims, 2 Drawing Sheets

METHOD OF RECYCLING HAZARDOUS WASTE

CROSS REFERENCE TO RELATED APPLICATION

This application is a Continuation-in-Part of our earlier copending application, Ser. No. 07/632,000, Filed Dec. 21, 1990, entitled "Method of Recycling Hazardous Waste," to be issued as U.S. Pat. No, 5,198,190 on Mar. 30, 1993.

BACKGROUND OF THE INVENTION

The present invention relates broadly to a waste recycling and metal recovery method. More particularly, the present invention relates to a method for recycling metal-bearing hazardous wastes to recover valuable metals and metal oxides. In the best mode, slags remaining after metal recovery are used to produce mineral wool, and no waste results.

Public awareness of problems associated with the rapid depletion of the earth's natural resources and disposal of industrial wastes has greatly increased in recent times. Such awareness, together with increased economic pressures, the tightening of competition, and government regulation of wastes have forced industrial concerns to take measures to minimize waste. In response, the focus of scientific undertaking in some industries has turned toward recovery and reuse of all commercially useful byproducts of industrial processes.

In the past, little attention was directed to the preservation of limited mineral resources. It was generally deemed more feasible to mine metal ores and to simply dump rich metal-bearing wastes than to salvage usable metals from waste products. This was particularly true in the case of industrial wastes that contained hazardous or toxic materials.

Hazardous industrial wastes were typically "stabilized" and/or captured in some generally non-leachable form with a basic material such as lime or cement. It was required to bury the stabilized materials in designated hazardous waste landfills. One widely accepted disposal method was to incorporate hazardous waste products into a glass-like matrix called slag that was used as a substitute for a natural rock aggregate in cement or asphalt used for paving roads and the like. However, the EPA has declared that no material that is considered hazardous can be applied to the land in any form, whether or not it has been diluted, treated, or otherwise stabilized. Hence, the older disposal methods have fallen into disfavor. Alternative processes for treating wastes to produce environmentally "safe" products have been proposed.

For example, U.S. Pat. No. 4,432,666 issued to Frey on Feb. 21, 1984 describes a process for storing and dumping hazardous wastes. Rostoker, U.S. Pat. No. 4,793,933 issued Dec. 27, 1988 teaches a method for treating metal hydroxide electroplating sludges by fusion of the oxides of the metals into Silica and Sodium slag. The Rostoker method relates to earlier EP Leaching standards, and has been proven incapable of achieving minimal-waste recycling. Lynn, U.S. Pat. No. 4,840,671 issued Jun. 20, 1989, relates to the stabilization of EAF dusts for disposal. The latter '671 reference teaches the use of calcium hydroxides as an entrapping agent for toxic cadmium, chromium, and lead constituents. This patent suggests combining various different waste products to be processed to produce "safe" compounds.

However, in view of the general awareness of environmental and health risks, such treatment and disposal techniques are no longer deemed environmentally or economically sound. Moreover, because industry pays a relatively high premium for waste treatment and disposal, it is desirable to provide a commercially viable method for recovering as much usable material as possible. Such methods would be directed to reducing loss of profits and expanding commercial markets. Specifically, it is desired to provide a process that can be carried out with equipment and apparatus already available in the industry.

The United States Environmental Protection Agency (U.S. EPA) classifies certain materials for controlled disposal and/or recovery. The U.S. EPA has determined that any products that are made from a hazardous waste and sold within one year of production is not a hazardous waste but a product. This product must be of known commercial value. This product cannot be a replacement for any product that is typically used on the land in any form. If the product from any hazardous waste reuse, recycle or reclaim system does not meet all of the rules the product is not a product but a waste. These rules state that any byproduct or waste that is derived from a process using hazardous waste, is a hazardous waste, even when this waste contains nothing that was in the original hazardous waste. The list of U.S. EPA-listed hazardous wastes is presently limited, but will undoubtedly be enlarged with time. There are presently a large number of waste products generally recognized as unsafe for conventional disposal which have not yet come under U.S. EPA scrutiny. For example, certain anodizing wastes such as F019 are presently listed but not classified as hazardous; sand used in blasting operations may be contaminated with nickel, chrome, or other metals that are considered toxic; and, baghouse dusts may contain carbon and hazardous materials that have no separate classification under the current law. Such wastes are therefore thrown away without meaningful disposal precautions, although they are widely believed to create hazards to the environment. Moreover, their disposal results in unnecessary depletion of existing natural mineral resources.

It is therefore desired to provide a viable method for reclaiming various listed and non-listed hazardous wastes. Such a method must effectively eliminate waste to conserve natural resources and avoid costly liability, for example, under the Resource Conservation and Recovery Acts ("RCRA") or Comprehensive Environmental Response, Compensation, and Liability Act ("CERCLA"). Moreover, such a method must be effective to overcome disadvantages associated with prior sodium-based recovery processes, such as high reagent cost, sodium volatilization at higher temperatures, pH imbalances in slags, low value byproducts, and production of waste.

In the prior art known to us, numerous methods are taught for recovering various industry wastes for production of useful products. Such products include furnace fuels, paving aggregates, sealing compounds, and mineral wool.

Mineral wool is a term broadly applied to various related vitreous products commonly used for insulation, padding, ceiling tile production, and the like. In general, mineral wool is a fiberglass-like material composed of very fine, interlaced mineral fibers, somewhat similar in appearance to loose wool. It is composed primarily of silicates of calcium and aluminum, chromium, titanium, and zirconium. Mineral wool producers commonly use natural rock or slag. Slag is a term broadly applied to refer to waste products of the primary metal and foundry industries, including deposits from the furnace lining, charge impurities, ash from fuel, and fluxes used to clean the furnace and remove impurities. Although metal producers and foundries strive to control the amount of slag, excess slag may result from the refining of metals.

Slags are classified as either "acid" (or high silicate) slags or "basic" slags, depending upon the relative quantities of acidic and basic sub-components. For example, typical acid slags contain between forty and fifty percent (40-50%) of acidic sub-component, such as silicon ($SiO_2$) and relatively small quantities ranging from one to five percent (1-5%) of basic sub-components, such as oxides of calcium (CaO) and magnesium (MgO). A typical basic slag that is used to refine or reduce metals comprises between twenty-five and fifty percent (25-50%) acidic sub-components such as silicon ($SiO_2$) and aluminum ($Al_2O_3$), and a relatively high percentage, from thirty-four to fifty percent (34-50%) basic subcomponents, such as oxides of calcium (CaO) and magnesium (MgO). Magnesium may be added to increase basicity. Basicity is the tool used to determine metal quality using basic slag. Basicity is calculated as follows: $CaO+MgO/Al_2O_3+SiO_2$. Basicity of typical basic slags ranges between 0.93 and 1.9.

Typically metal producers are most interested in the highest quality metals with the least amount of slag production. Traditionally it is expensive to melt slag, and the slag is of little worth or it is an environmental liability. Because high quality scrap metal is abundant, modern metal producers prefer to use acid slags and not refine metals. For best results, mineral wool producers seek slags or rock that can be blended together and melted at relatively low temperatures. Preferably the mineral wool slag will contain no reducible metals, or will be an acid slag that will eliminate metal buildup in the furnace.

Mineral wool is classified according to the raw materials used in its production. For example, Rock Wool is produced from combinations of natural rocks and/or minerals. Slag Wool comprises a composition of iron, copper, and lead slags typically removed from blast furnaces, and may contain some fluxing materials. Glass Wool (fiberglass) is composed principally of silica sand, soda ash, and limestone. Refractory (high-temperature) or "Certa" wool may be made from oxides of aluminum, chromium, zirconium, or titanium and silica sand. Further subclassifications of these products relate to the quality or purity of the wool. For example, slag wool is subclassified for purity according to color; black, gray, and white wools are available. The tool for determining the quality of mineral wool produced from a slag charge is the Acid-to-Base ratio (A:B). The formula for determining A:B is $Al_2O_3+SiO_2/CaO+MgO$. In a typical mineral wool cupola slag, A:B ranges between 0.74 and 2.316.

Prior art patents related to the production of mineral wool using various waste products include Gee U.S. Pat. No. 4,822,388 issued Apr. 18, 1989; and U.S. Pat. No. 4,486,211 issued to Monaghan on Dec. 4, 1984. The latter-referenced '211 patent discloses a method and apparatus for melting discarded fly ash and spinning it into mineral wool. However, none of the prior art known to us teaches viable methods for recycling listed hazardous materials containing waste metal oxides such as chromium, nickel, cadmium, zinc, copper, iron, and lead oxides or hydroxides into pure metals or alloys while producing mineral wools from aluminum, silica, calcium, zirconium, and titanium oxides.

Other relevant prior art patents known to us relate to methods for treatment, recovery, and recycling. For example, Allen, U.S. Pat. No. 3,870,507, issued Mar. 11, 1975 is directed to a method for forming briquettes from steel mill wastes such as steel and iron dust, mill scale, and iron oxides with an organic binder to reduce slags formed during recycling. The resulting iron oxide briquettes are recycled by being fed into the production furnaces with new materials in the steel-making process.

U.S. Pat. No. 4,004,918 issued to Fukuoka on Jan. 25, 1977, teaches a method for treating certain wastes resulting from stainless steel operations. Briquettes are formed from the dust and scale from stainless steel ovens combined with organic and inorganic binders. The briquettes are returned to the existing electric arc furnace, and usable metals are extracted for further use in making stainless steel.

Stephens U.S. Pat. No. 4,396,423 issued Aug. 2, 1983 and related U.S. Pat. No. 4,053,301 issued October, 1977 relate to a process for recovery of iron carbide and zinc metals from BOF dusts of the steel-making process. The Stephen's system reduces the dust wastes within a fluidized bed reactor in the presence of carbon, recovers zinc by vaporization, and produces iron carbide and gangue, a worthless rock or matter in which metals are contained.

U.S. Pat. Nos. 4,758,268 issued Jul. 19, 1988 and 4,836,847 issued Jun. 6, 1989 to Bishop disclose apparatus and processes for reclaiming metals from electric arc furnace and BOF dusts. The systems described therein are directed to providing recovery of metals from EAF wastes in a reducing environment. In the method, carbon is added to the molded briquettes to reduce the iron and zinc content of the waste. However, the process is incapable of producing a slag suitable for use in the production of mineral wool, since these processes attempt to minimize slags to less than 8%. Moreover, the Bishop system is specifically indicated to be unsuited for rotary kilns, shaft furnaces, retorts, and fluidized bed furnaces.

SUMMARY OF THE INVENTION

The present invention is directed to a smelting process for recycling hazardous industrial wastes. Wastes are blended with carbon or aluminum reducing agents to simultaneously recover metal alloys (reducible metals), metal oxides (volatile reducible metals), carbon dioxide and man-made vitreous fiber (non-reducible metals).

Three groups of wastes are blended and processed. The first group of materials consists of waste metal oxides that are to be reduced, including oxides of iron, chromium, copper, nickel, zinc, and lead. The second group, used for reducing, primarily comprises solid carbon and aluminum. The third group of materials broadly functions as primary fluxing agents. Typical fluxes include calcium oxide, calcium hydroxides, and silica dioxide in its various forms.

In the best mode, total recycling is accomplished by reclaiming metals and metal oxides from hazardous industrial wastes and by producing mineral wool from slags. In the best mode plurality of different hazardous and non-hazardous wastes are combined to produce valuable products. Of particular advantage is the fact that the present process may be accomplished using various types of industrial equipment already in place.

Among the wastes that may be applied in the instant process are U.S. EPA-listed hazardous wastes of Series D, F, K, P, and U. These wastes are mixed in proper proportions in combination with calcium, pulverized to a predetermined mesh size, and blended with liquids such as waste water to produce a homogeneous mass.

Calcium is an essential flux in the instant recycling process. The invention involves the production of mineral wool as well as recovery of metals. Calcium imparts beneficial qualities to the mineral wool product. While virgin calcium may be used, preferably the source of calcium will be calcium-stabilized wastes, such as metal sludges stabilized with calcium oxide or lime. Calcium lowers the sulfur content, removes phosphorous, and raises pH to facilitate metal reduction. Calcium lowers the eutectic point of the waste mixture, and fluxes metals or alloys as it removes sulfur.

Regardless of the type of furnace used, a pellet or briquette must be formed that includes finely crushed carbon for metal reduction.

Two ways to form a solid mass that have worked very well are as follows: Semisolids, i.e., sludges can be blended into a mass that resemble pottery clay. This mass can be roll briquetted or extruded into predetermined shapes and sizes before curing and drying. Dry wastes can be preblended or weigh fed onto a disk or drum pelletizer that rolls the material into a ball. Gravity is used for compaction.

Calcium oxide is well known to make high strength lime crystalline bonds with silicates. The surface tension of water pulls small particles together during pelletizing and acts as a lubricant in pressure briquetting or extrusion operations. Binders such as starch and other wastes can be added to increase the film reaction with water. Waste sugar or molasses byproducts can be added to develop a calcium sucrate bond when the briquettes are made. Binders that are unacceptable are those that contain large amounts of MgO, MnO, phosphorous and sulphur. Large concentrations of magnesium oxide and manganese oxide can make a slag that will not form good fiber. Phosphorus and sulphur in the metals produced in this operation lowers the metals value.

Some waste (i.e., high lime K061) may contain all the calcium needed to briquette but must be prehydrated before final briquetting. Without this step, the exothermic reaction within the briquette will produce steam and the briquette will expand and fall apart before curing.

The process can be carried out in any applicable furnace regardless of heat source. That includes gas, electric, oil, coal and coke fired units. The major difference in each operation is the size of the briquettes. The upper size limit for the briquette is 1.5-2 inches in diameter because of drying problems. This size is ideal for shaft furnaces such as a cupola. Micro pellets are more suitable in an electric arc furnace.

It has been found that briquettes formed with powdered waste carbon from a bag house will reduce iron, nickel, tin, cadmium, copper, chrome and zinc prior to the briquette melting. A standard granulated carbon product would not work as well. The reason was found to be that a very efficient solid to solid (metal oxide to carbon) reaction or reduction process was taking place. The carbon will remove the oxides from metals and form CO gas. This CO gas escaping from the briquette removes other oxides from metals to make $CO_2$ gas. This reduction reaction starts at 1700° F. but is most efficient at 2200° F. The reduction of metals by this method is faster than a standard blast furnace. The CO reduction process in a blast furnace typically takes seven to eight hours to complete. The metals can be reduced by this process in twenty minutes or less.

The briquetted material is formulated to melt at between 2,200° F. and 2,600° F. The resulting slag will stay liquid from 2,200° F. to 1,700° F. allowing standard mineral wool to be produced. When large quantities of chrome or vanadium need to be reduced aluminum has been used for reduction. Aluminum can reduce metals with higher melting temperatures more efficiently than carbon. The high temperature metals alloy with iron and/or nickel with a lower melting temperature. This allows a lower temperature furnace to be used to extract high temperature metals.

Zinc is reduced and volatilizes from the furnace charge. Cadmium volatilizes before reduction. Zinc and cadmium oxide are captured from the exhaust air stream. Many wastes contain chlorides and/or fluorides that make the capture of these metals in their pure form difficult. The $CO_2$ produced from the furnace also will oxidize zinc and/or cadmium. The exhaust from the furnace can be oxidized with an afterburner, and the zinc and cadmium are thereafter recovered as an oxide.

Lead has been reduced and tapped from the furnace as a secondary alloy. Lead separates from iron into two distinct layers in the furnace or mold. When halogens are present (i.e., chlorides or fluorides) lead will volatilize before reduction, and it can be captured like zinc or cadmium.

The slag comprises metal oxides that were not reduced or volatilized. These oxides are necessary to produce a good fiber from the slag silicon dioxide ($SiO_2$), calcium oxide (CaO), and one or more of the following; aluminum oxide ($Al_2O_3$), chromium oxide (CrO), titanium dioxide ($TiO2$), zirconium oxide ($ZrO_2$). Typically small quantities of magnesium oxide (MgO), and manganese oxide (MnO) can be in the slag but these metal oxides need to be as low as possible. Certain fibers require that some iron remain as FeO in the slag to enhance fiber production. This is accomplished by reducing the amount of carbon in the briquette.

Preferably heat from the exhaust gases produced in the instant process are recycled into the process to reduce fuel consumption. When air is used in a coke filled furnace the larger solids are recycled into the process. Unspun slag particles (i.e., "shot") that remains from the production of mineral wool are either recycled into the system or sold for shot blast material. Various specific examples of numerous possible applications of the present process are provided.

Thus it is a fundamental object of the present invention to provide a viable method for recycling industrial wastes.

Another fundamental object of the present invention is to provide a recycling process that protects and preserves valuable mineral resources.

A similar broad object of the present invention is to provide a method for recovery of metals and metal oxides from hazardous wastes.

Another fundamental object of the present invention is to provide a commercially viable method for recycling hazardous and non-hazardous waste.

A further basic object of the present invention is to provide a method for recycling waste that may be practiced using existing industrial systems and apparatus.

Another basic object of the present invention is to provide a waste recycling method that combines various hazardous and non-hazardous wastes to produce commercially valuable products.

Yet another object of the present invention is to provide a method for recycling hazardous wastes to produce mineral wool.

Still another object of the present invention is to provide a waste recycling method that minimizes industrial waste and itself produces no hazardous by-products.

An additional object of the present invention is to provide a calcium-based hazardous waste recycling method that overcomes problems associated with previous sodium-based stabilization and recovery processes.

A further object of the present invention is to provide a method for recovering valuable metal alloys from metal-bearing hazardous wastes.

Another object of the present invention is to provide a commercially viable waste recycling method that is an effective alternative to treatment and disposal as established by RCRA, BIF, CERCLA, and similar environmental protection Acts.

A specific object of the present invention is to provide a method for recovering chromium, nickel, cadmium, zinc, iron, lead, copper and other metals from industrial waste products.

A similar object of the present invention is to provide a method of recovering various alloys from industrial sludge.

A further object of the present invention is to provide a waste recycling method in which titanium, zirconium, aluminum, silica and chromium oxides are used in the production of mineral wool.

Another object of the present invention is to provide a waste recycling method that permits continued use of pre-existing waste treatment systems.

An additional object of the present invention is to provide a recycling method in that various listed and unlisted wastes are combined with calcium and silica to produce valuable products.

Still another specific object of the present invention is to provide a hazardous waste recycling method in that electric arc furnace dust is combined with calcium and silica products to produce mineral wool or aggregates suitable for mineral wool production.

Yet another object of the present invention is to provide a hazardous waste recycling method that may be accomplished in various types of furnaces.

Another object of the present invention is to use waste carbon to reduce metal oxides contained in other wastes.

Another object is to use waste containing fluoride and sodium as secondary fluxes for metal production.

Still another object is to use waste containing CaO and $SiO_2$ as primary fluxes for metal producers.

Another object of the present invention is to use the fluxes, (slag) from the production of metals to directly produce valuable products.

These and other objects and advantages of the present invention, along with features of novelty appurtenant thereto, will appear or become apparent in the course of the following descriptive sections.

BRIEF DESCRIPTION OF THE DRAWINGS

The enclosed drawings, which forms a part of the specification and which are to be construed in conjunction therewith, and in which like reference numerals have been employed throughout whenever possible to indicate like parts.

DETAILED DESCRIPTION

Figure 1:
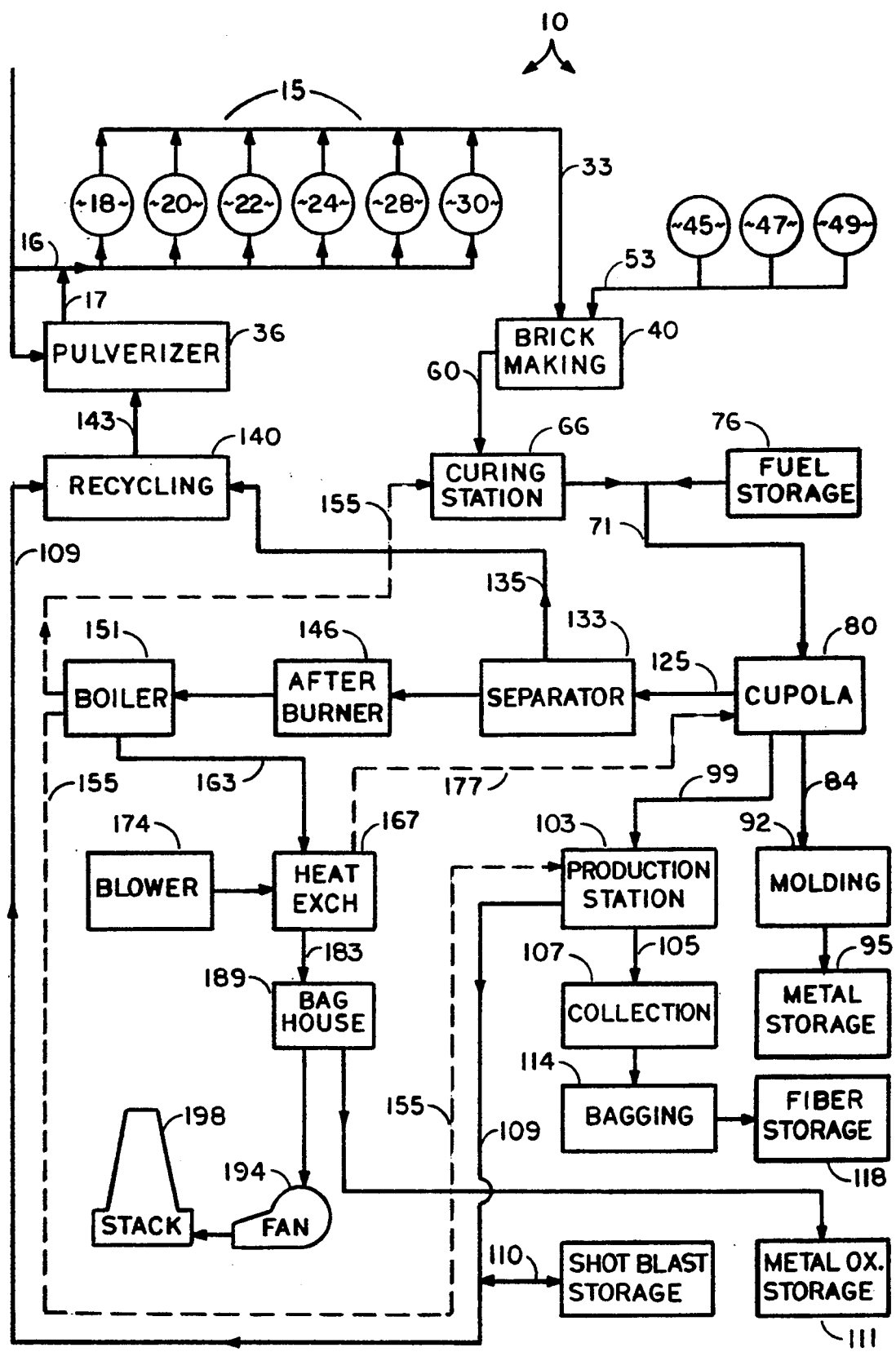
FIG. 1 is a block diagram of the system wherein the process employs a shaft coke fired furnace; and, FIG. 2 is a block diagram of an alternative process employing a plasma arc furnace.

Introduction we have recently perfected the herein disclosed processes for blending both hazardous and non-hazardous industrial wastes with carbon or aluminum reducing agents to simultaneously recover metal alloys, metal oxides, carbon dioxide, and vitreous fibers. Three groups of wastes are blended and processed. The first group of materials consists of waste metal oxides that are reduced during the process. Examples include oxides of iron, chromium, copper, nickel, zinc, lead and cadmium. The second group of materials, primarily solid carbon and aluminum, are used as reducing agents. The third group of materials are broadly employed as primary fluxing agents. Typical fluxes include calcium oxide, calcium hydroxides, and silica dioxide in its various forms. As a result, we produce usable metal alloys, metal oxides, and mineral wool from various combinations of waste materials, including common hazardous and non-hazardous industrial wastes.

Raw Materials

Inorganic industrial wastes may be collected from numerous sources for use in the instant methods. Some of the raw wastes used in the process contain two or more members of the three broad groups listed above. The wastes used by this process are not selected by what is to be recovered, but rather by their overall usage in the reduction/reclamation process. Wastes that may be utilized by the present technology are listed and categorized in Table 1:

TABLE 1

| EPA Designation | EPA-Classified Wastes<br>Definition/Source |
|---|---|
| K004 | Waste water treatment sludge from production of zinc yellow pigments. |
| K005 | Waste water treatment sludge from production of chrome green pigments. |
| K006 | Waste water treatment sludge from production of chrome oxide green pigments. |
| K007 | Waste water treatment sludge from production of iron blue pigments. |
| K008 | Oven residue from the production of chrome oxide green pigments. |
| K045 | Spent carbon from the treatment of waste water containing explosives. |
| K061 | Emission control dust/sludge from production of steel in electric furnaces. |
| K062 | Spent pickle liquor from steel finishing operations that use Chlorine. |
| K069 | Emission control dust/sludge from secondary lead smelting. |
| K088 | Spent aluminum pot liner. |
| P021 | Calcium cyanide |
| P029 | Copper cyanide |
| P030 | Cyanides (soluble cyanide salts), not otherwise classified. |
| P074 | Nickel cyanide |
| P104 | Silver cyanide |
| P106 | Sodium cyanide |

TABLE 1-continued
EPA-Classified Wastes

| EPA Designation | Definition/Source |
|---|---|
| P121 | Zinc cyanide |
| P122 | Zinc phosphide, if greater than ten percent. |
| U032 | Calcium Chromate |
| U249 | Zinc phosphide (concentrations less than 10%) |
| D006 | Cadmium, if greater than 1 mg/L total leachate |
| D007 | Chromium, if greater than 5 mg/L total leachate |
| D008 | Lead, if greater than 5 mg/L total leachate |
| D011 | Silver, if greater than 5 mg/L total leachate |
| F006 | Waste water treatment sludges from electroplating |
| F007 | Spent cyanide plating bath solutions from electroplating operations |
| F008 | Plating bath residues from the bottom of plating baths from electroplating cyanides |
| F009 | Spent stripping and cleaning bath solutions from electroplating cyanides |
| F010 | Quenching bath sludge from oil baths from metal heat-treating operations using cyanides |
| F011 | Spent cyanide solutions from salt bath pot cleaning from metal heat-treating operations |
| F012 | Quenching waste water treatment sludges from metal heat-treating operations using cyanides |
| F019 | Waste water treatment sludges from the chemical conversion coating of aluminum |
| F024 | Wastes, not limited to, distillation residues, heavy ends, tars, and reactor clean-out wastes from chlorinated aliphatic hydrocarbons, having carbon content from one to five, utilizing free-radical catalyzed processes. |

EPA designated wastes K004, F006 and P121 or P122 may exhibit an identical chemical analysis, but they have EPA waste codes that are different. K005, K006, K008 could resemble a certain F006 specification, and each could be used interchangeably. Each waste code given contains either a primary flux such as calcium oxide (hydroxide) or secondary flux, i.e., sodium (hydroxide) or fluoride. Materials designated K088, K045, P021, P030 and P106 in Table 1 contain stable carbon (fixed carbon) to be used as reducing agents in the process. They each also contain fluxing agents to clean metals, i.e., K088 has sodium or fluorides, P021 has calcium and P030 and P106 have sodium. The calcium and the cyanide in the waste also serve as cement for bonding agents. This makes the briquette or pellets stable enough to be cured, dried and melted in the process.

The short list that follows are typical cyanide salts that could be used in this process that could contain both metals and a sodium flux.

TABLE 2
Cyanide Salts used in Process

| Cyanide Form | EPA ID Numbers |
|---|---|
| $NaCu(CN)_2$ | F006, P029, F007, F008, F009 |
| $Na_2Zn(CN)_4$ | F006, P121, F007, F008, F009 |
| $Na_4Ni(CN)_6$ | P074 |
| $Na_3Fe(CN)_6$ | F006, K088, F007, F008, F009, F011, F012 |
| $Na_4Fe(CN)_6$ | F006, K088, F007, F008, F009, F010, F011, F012 |
| $NaAg(CN)$ | P104 |
| $NaCd(CN)_2$ | F006, F007, F008, F009 |

Iron cyanides are used as the primary building blocks for both laboratory testing chemicals (No EPA ID other than P030) and blue pigments such as K007. Although nickel cyanide is not used in typical plating processes, the material can be found in F006. Because of cross contamination during the plating process, nickel cyanide can be formed. When steel is plated with another metal such as cadmium, iron cyanide complexes are formed. These cyanide complexes are difficult to treat before landfilling. The resulting sludge is very hazardous, and disposal is expensive.

Other wastes that may be used in the process include sand from casting or blasting operations, carbon from baghouse dusts, coal and coke fines and slags. Calcium-stabilized wastes that may contain a variety of ingredients, including both reducible and nonreducible metals, metal oxides, hydroxides and/or organics are also useful in the process. Typical compositions of such calcium-stabilized wastes are listed in Table 3:

TABLE 3
Calcium-Stabilized Wastes

| Ingredient | Percent of Material |
|---|---|
| CaO | 41.2 |
| Ignition Loss | 32.7 |
| $Al_2O_3$ | 1.7 |
| $Si_2O$ | 13.1 |
| $Fe_2O_3$ | 4.47 |
| Total Solids | 69.24 |
| Organics | 4.61 |
| As | 0.000792 |
| Cd | 0.00171 |
| Cu | 0.0549 |
| Hg | 0.000207 |
| Ag | 0.000298 |
| Ba | 0.567 |
| Cr | 0.275 |
| Pb | 0.0514 |
| Ni | 0.0225 |
| Zn | 0.197 |

A primary fluxing agent, calcium, is also found in most plating wastes listed such as F006, F007, F008, and F009, as well as P029, F030, U032, D006, D007, D011, F012, and F019. The reason that calcium is found in all or most of the "F" and "D" series waste is that lime is commonly used in the same way as sodium hydroxide to remove the contaminants from the water and produce sludge. The sludge is "stabilized" with lime before land filling to keep the hazards in the sludge contained.

Secondary fluxing agents used in most smelting operations have one primary function. This is to change the viscosity of the slag. As slag gets hotter, it becomes less viscose. But in cold spots, such as the furnace walls and coke in shaft furnaces, the slag becomes sticky and viscous causing bridging, channeling and thick crust on furnace walls. Secondary fluxes change the viscosity of the slag at lower temperatures. This cleans the walls of a furnace and coke in shaft furnaces. It also encourages metal to fall quickly to the furnace bottom instead of flowing out with the slag.

Standard secondary fluxes are soda ash and fluorspar, and are used in metallurgical furnaces as the secondary fluxes. Soda ash ($Na_2CO_3$) is calcined in the furnace to create $Na_2O$, the secondary flux that is strongly basic. Fluorspar ($CaF_2$) is considered a neutral flux that works on the silicate network of a slag. The $SiO_2$ can become $SiF_4$ as the slag becomes more acidic. As the slag becomes more basic, the fluoride is present as fluoride ions.

Processes

Figure 2:
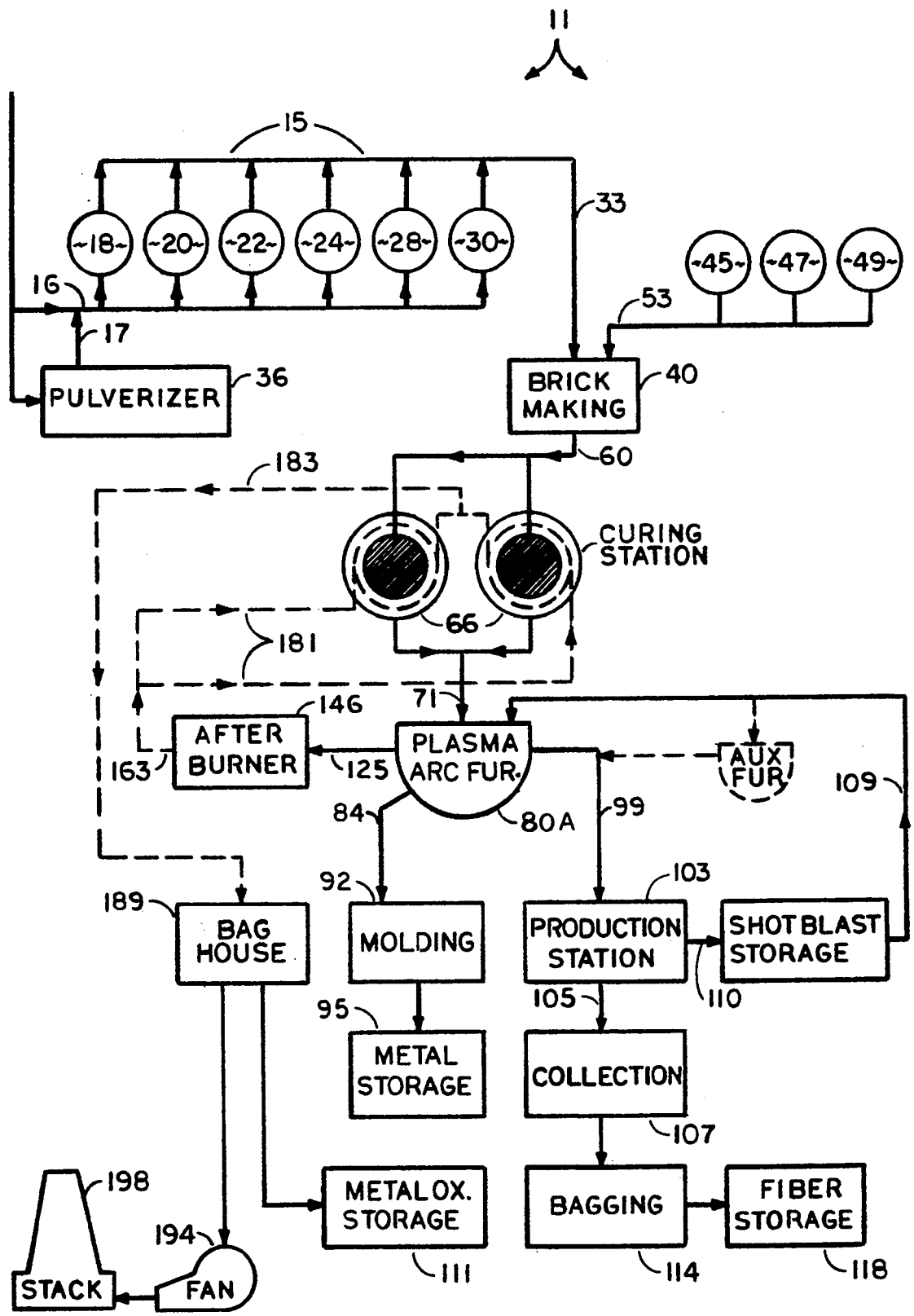

Because numerous types of existing waste treatment apparatus may be used, only general reference is made herein to broad classes of functional components that may be effectively used in carrying out the present methods 10 (FIG. 1) or 11 (FIG. 2). Process 10 preferably employs a shaft coke fired furnace and a plasma arc.

System 11, on the other hand, uses a plasma arc furnace process, and thus emphasizes electricity use over the burning of carbon. System 11 is preferred where limitations on CO emissions are severe.

Waste products containing metals such as free-standing sludge comprising twenty-five to fifty percent (25–50%) solids and dry dusts such as K061 (electric arc furnace dust) are collected from various sources and stored. Wastes such as K088 (first cut) may be pulverized to powder before storage in the silo storage facility 15. Line 16 broadly designates a variety of conventional bulk material processing apparatus. Facility 15 collectively comprises solid waste silos 18, 20, 22, 24, 28 and 30 and liquid waste silos 45, 47, and 49. Dry solids of 100 mesh or less particle size are directly inputted to storage silos or buildings 18, 20, 22, 24, 28, and 30. Solids or semi-solids that require size reduction are pulverized in system 36, and thereafter stored in the silos as indicated by line 17.

The determined amounts of selected waste are delivered from the storage facility 15 via a conveyor 33 to the brick-making operation 40. This step can comprise both briquette-making and pelletizing; the point is to provide conveniently shaped briquettes or pellets for subsequent curing, drying, and reduction. The material is weighed and blended with predetermined amounts of liquids stored in tanks 45, 47 and 49, preferably including water and certain metal-bearing liquids such as K062, P021, P029, P030, P074, P104, P106, P121, F007, F009, F011 or water-soluble oils. Liquid or semi-liquid substances are delivered via pipe 53 into the brick making operation 40, and are mixed with the waste from line 33.

When the brick making process involves sludges or other high moisture materials, the materials are weighed and placed into a mixer. The resulting mass resembles clay and can be briquetted by extrusion or roll briquetting. When the materials are dry, the materials can be pre-weighed and mixed, or they may simply be metered onto a pelletizing disk or pan. Liquid is sprayed onto the dry material to be pelletized along with binders when necessary. The individual particles pick up or are coated by the liquid and the particles start to agglomerate. The agglomerate is held together by surface tension between the particles. The particles roll down the slope of the pelletizing disk picking up more particles. Gravity causes compaction as the agglomerate gets larger. This results in an uncured pellet that is held together by capillary pressure.

The size of the pellet or briquette depends on the type of furnace to be utilized. Where an arc furnace or certain types of gas fired reverberatory furnaces are used, a micro pellet of less than one-half inch has proven successful. Other types of furnaces, such as shaft types, use the largest size pellets or briquettes. The largest pellets or briquettes are about 1.5 inches in diameter. When the size gets much larger than 1.5 inches mean diameter, the pellet or briquette cannot be easily dried. The briquettes thus formed are conveyed from the brick-making machine 40 via line 60 into a curing station 66. Although the curing and drying operation can be accomplished by a heat source other than the furnace, many furnaces that can be utilized by this process waste heat in the exhaust air stream.

Pellets or briquettes are cured in high humidity for 8–24 hours before the drying process. This curing time is necessary because the calcium sucrate bonds take approximately one hour to cure at ambient temperatures. Secondly, as the greenfeed cures, the CaO (now $CaOH_2$) becomes a masonry mortar. The greenfeed is brought up to 220° F. or more over a three to four hour period after curing, and the moisture is extracted before delivering the resultant dried feed into the furnace.

Two types of curing stations 66 have been successful for us. The first uses steam from the waste heat boiler 151, as indicated by line 155 (FIG. 1). It takes twenty-four hours to cure and an additional twelve hours to dry a 1.5 inch green pellet. The second type of curing and drying involves the direct recirculation of exhaust gases (FIG. 2), as indicated by lines 181 and 183.

With process 11 (FIG. 2) freshly made pellets or briquettes are is placed into storage (i.e., feed silos) that can hold up to eight hours of furnace feed per silo. The heat from the furnace exhaust heats the outside of the silo. As heating progresses, the feed on the bottom of the silo becomes dry, supplying the warm moisture at the top of the silo that promotes curing. In this way the pellets or briquettes are cured, dried and stored in one unit.

In process 10 cured briquettes are transferred from curing station 66 by skip cart or conveyor 71. Coke or similar fuel retained in storage bin 76 is conveyed together with the cured bricks to a cupola 80 or similar shaft furnace. In the best mode a cupola 80 or shaft furnace requires that large briquettes be used. However, the process may also employ other types of furnaces, such as electric arc, plasma arc or reverbatory furnaces. Where the latter furnaces are employed, the feed material can be reduced in size. The cupola can be fitted with a plasma torch to eliminate or reduce the consumption of coke.

The cupola 80 thus charged with the fuel and pellets or briquettes heats to a temperature of between 1,660° F.–3,100° F. In the best mode, temperatures between 2750° F. and 3000° F. are preferred. During heating carbon or aluminum in the briquettes results in a reducing atmosphere within the structure of the briquettes or pellets.

In process 10 (FIG. 1) gasses from coke combustion heat the charge material as they move up the shaft. In process 11 (FIG. 2) an electric arc in plasma arc furnace 80A heats the charge in the same manner when operated in the "cold top" mode. As the charge material toward the bottom of the furnace melts, the charged material at the top moves down toward the melting zone. As the charge moves down, the heat of the furnace gasses increases, forcing a reaction within each piece of charge material. Any moisture found as hydroxides as well as carbonates are removed as the charge material preheats from the hot gasses. This process of calcination starts on the surface of the feed material at about 1,300° F. The calcination of a 1.5 inch diameter piece of charge material is complete in its center by the time the surface temperature of the charge reaches 2,100° F.

Because the feed material, whether pellets or briquettes, contains carbon, certain metals will be reduced before the charge melts. At 1,800° F. the finely divided particles of carbon in the charge material will remove oxygen from metals that are the closest. This process takes place on the surface first and moves into the charge as the center heats. The charge must not melt until the reduction is complete. When the center of the charge reaches 2,400° F., the benchmark metal (iron) will be fully reduced within fifteen minutes. The reaction in the center of the charge is as follows: Fe- $_2O_3 + 2C \rightarrow 2Fe + CO + CO_2$ On the surface of the charge the more likely reaction is:

$$Fe_2O_3 + 3C \rightarrow 2Fe + 3CO$$

Iron is chosen as the benchmark metal because it goes through many changes in oxide phases. Both carbon and the resulting carbon monoxide will reduce $Fe_2O_3$ to Fe+ (i.e., pure metallurgical elemental iron) at a rate of 99%+ in fifteen minutes at 2,400°–2,500° F. This benchmark is very important. Gold, silver, zinc, lead, copper, nickel and tin are reduced before the FeO in the charge material is reduced. Because no reduction occurs in the slag, it is important that $Fe_2O_3$ is reduced to Fe+ before the charge material melts. When carbon reduces a metal, carbon (a solid) becomes carbon monoxide. As this gas escapes the charge, it contacts reducible metal oxides and reduces the metal to form $CO_2$. If the $CO_2$ contacts other carbon particles it will form 2(CO) molecules that can remove two more molecules of oxygen, forming $2(CO_2)$ again, or it escapes the charge material into the furnace atmosphere.

When large amounts of chromium oxides are present, aluminum is added into the pellet or briquette along with carbon. Chromium can be reduced by carbon and carbon monoxide but the mean result is a forty-five percent reduction efficiency. A high percentage of the chromium is tapped from the furnace in the carbide form. This is because chromium oxide is being reduced at approximately the same temperature that the cured feed material is starting to melt. Aluminum in the charge material causes a modified thermite process. Two mole pounds of aluminum will remove the oxygen from two mole pounds chromium oxide if the chromium is in the following form:

$$Cr_2O_3 + 2Al \xrightarrow{2,000° F.} 2Cr + Al_2O_3$$

This process can also increase the temperature at the point of the formation of alumina to +5,000° F. The iron that is in a charge material forms an alloy with the chromium to make a eutectic alloy with a lower melting point. Reducible metals such as copper, chromium, iron, and nickel or alloys may be drawn off the molten mixture via the lower tap 84, that is preferably coupled to a mold 92. In the mold 92, reducible metals are shaped and cooled. The molded metals may be transferred after cooling to suitable storage 95 for sale.

Based upon our recent experimentation, substantial purity is obtained in the recovered reducible metals (i.e. tapped off from the furnace). For example, treated sludges containing oxides or hydroxides of nickel and iron only will reduce virtually quantitatively to a ferronickel alloy. Copper-rich sludges may be reduced to copper metal of ninety-nine percent (99%) purity. From oxide mixtures containing iron, nickel, and chromium, 99% of iron, 98% of nickel, and approximately 85% of chromium may be recovered as an alloy.

As described in the following examples, reducible metals may be reclaimed as pure metals or alloys, and volatile metals may be reclaimed as concentrated oxides. During heating, the briquettes are melted and may be subsequently separated into various component products. Such products include reducible metals, volatile metals, non-reducibles such as certain metal oxides, silica, and calcium, and exhaust products.

After the reducible metals are separated out and removed from the molten mixture, a molten slag remains. The slag is devoid of volatile metals such as cadmium, lead, zinc, and various metal oxides such as oxides of aluminum, chromium, titanium, silicon, zirconium, and calcium remain. The latter metal oxides, that are essential for the production of mineral wool, are drawn off via the upper tap 99 of the furnace 80.

Approximate melting points before melting are as follows: $SiO_2$—3,133° F; $Al_2O_3$—3,672° F.; CaO—4,737° F. When brought up to 2,600° F., these materials will not melt as pure materials, but will start to blend and flow together where surfaces touch to form a eutectic slag or flux. This slag has a lower melting point than any single element of the mixture. When the charge is properly formulated, the slag formed from CaO, $Al_2O_3$ and $SiO_2$ will remain liquid or remelt at 1,600° F. to 1,800° F. The viscosity of the slag can be modified by the presence of secondary fluxing agents such as sodium and fluoride at less than five percent of the slag weight. These secondary fluxes are also found in waste materials in usable forms. Secondary fluxes are primarily used to keep the furnace walls and/or coke clean by changing the viscosity of the slag in most furnace operations.

The slag resulting from the melting of CaO, $SiO_2$ and $Al_2O_3$ removes sulphur and protects the metals being produced from reoxidizing in the firing zone of the furnace. When the slag is formulated properly, the slag can be spun into fiber. The alumina in the slag is called a modifier. Other useful modifiers for slags and titanium dioxide, zirconium dioxide and chromium oxide.

From tap 99 the metal oxides may be blown or spun into mineral wool at production station 103. Any trace amounts of heavy metals that the slag contains are tightly bound into the calcium-alumina-silicate matrix.

Testing has shown that the slower a vitreous material cools, the more crystalline the material becomes and the easier it is to extract trace heavy metals with water. This is because the slag matrix can exclude the metals that do not fit the silicate bonds perfectly. When broken, the vitreous material will break along the points where the bond is weakest, between the crystal planes, that are also the points where heavy metals are present.

Quick cooling of a vitreous material avoids the crystalline state. The faster the cooling, the closer the slag comes to being truly amorphous, with heavy metals included into the calcium-alumina-silicate bonds. Mineral wool fiber strands are formed and cooled in less than ten milliseconds.

The mineral wool produced at station 103 is fed via conveyor 105 into collection bins 107, and subsequently separated and packaged for sale in a bagging machine 114. Alternatively impure material can be recycled to station 140. After bagging, the mineral wool is retained in storage 118 for sale. The shot, comprising unspun particles of slag, is recycled, in this example from station 103 via conveyor 109 (FIG. 1) into the recycling station 140. As indicated in the following examples, shot generally comprises one-third of each mineral wool cycle.

The shot can be recycled within the system by rebriquetting or pelletizing the shot with the fresh feed into greenfeed. The shot is considered an inert in the formulation because it is formulated properly for wool production and contains no metals to be reduced. Alternatively the shot can be screened, bagged and sold as shot blast material in step 110 (FIG. 2). This shot will last three times longer than sand in a sand blast unit before breaking apart. Further, the shot can be placed into another smaller furnace that does not waste energy with the smelting process. This furnace could be a semi-submerged arc furnace, which is the auxiliary furnace of FIG. 2. The shot is heated until liquid. Liquid slag will conduct current, but with high resistance. The resistance of the slag heats the slag and the liquid slag melts more shot. The liquid slag is tapped at 99 spun into fiber at production station 103. The resulting shot is returned to the furnace via line 109.

The volatile metals are volatilized in the presence of carbon. Zinc and lead oxides are special metals found in many types of waste. Zinc oxide will reduce easily within the charge material but zinc oxide's reduction temperature is 2,000°–2,200° F., well above the volatilization point of zinc metal (1,665° F.). Zinc metal will fume out of the charge material from 1,665° F. and up. When halogens are present (fluorides and chlorides), both lead and zinc start to volatilize sooner, 1,400° F. for zinc chlorides and 1,450° F. for lead chloride. When enough halogens are present, the lead will fume before the best reduction point for lead oxide (1,800° F.). Lead oxide will also fume when the lead is not reduced starting at 1,700° F. and, if not captured in the slag, will be very volatile at 2,700° F. If the lead is reduced, it can be tapped from the furnace like iron, nickel, copper, etc. When iron or iron alloy is the main reducible metal, the lead, much like copper, will not stay in the iron, but separate into a layer (either in the furnace or mold) that can be removed when the pig is cooled and removed from the mold. When. the furnace is tapped intermittently, the lead would come off the furnace first before the iron or iron alloy, making it easy to separate as a secondary metal.

Cadmium oxide will volatilize before reduction and escapes the charge material. The metals are reduced and/or volatilized before the charge material starts to melt. The charge material starts to melt from 2,400° F. to 2,600° F. Volatile metals and other exhaust products are directed out of cupola 80 via exhaust ports 125.

In process 10 port 125 (FIG. 1) feeds into a heavy solids separator 133. A fine water mist injected into the separator 133 separates out particles of a size larger than 10 microns from the exhaust products. The larger particles are transferred from separator 133 via conveyor 135 into recycling station 140 and back into the pulverizer 36. They are recombined with other waste mixtures from storage facility 15 for further processing in accordance with the present method. Port 125 in process 11 (FIG. 2) preferably has no heavy solids separator.

Solid particles smaller than 10 microns and exhaust gases remaining after processing in separator 133 are passed into an afterburner 146. In afterburner 146 these particles and gases that include carbon and carbon monoxide and/or other combustibles are mixed with air and natural gas and ignited. The mixed gas stream is oxidized by an afterburner to convert CO to $CO_2$, Zn to ZnO, Pb to PbO, etc. This enables a standard air pollution device to be used to remove the metal oxides from the air stream. These metal oxides can be refined or sold as is into the existing industries. Energy produced from the combustion of the exhaust stream of the furnace can be used to make steam from fiberizing molten slag, for preheating of the furnace blast air, or for drying or curing charge materials.

Hot burning gasses pass into a waste heat boiler 151 (FIG. 1) that produces steam. As indicated by broken lines 155, the steam is piped out of boiler 151 and used to power the briquette curing-dryer station 66 and the mineral wool production station 103. The cooled exhaust gases are directed via pipe 163 into a heat exchanger 167. The gases release heat that is used to heat outside air fed into exchanger 167 via blower 174. As indicated by dashed line 177, preheated air warmed by the exhaust gases is piped into the tuyeres of cupola 80. Cooler gases are subsequently directed via duct 183 into a baghouse 189 (FIG. 1).

The curing technique of process 11 (FIG. 2) is different. Furnace 80A has little heat value in the exhaust gasses. From furnace 80A the exhaust, having little or no large particles, is directed to the afterburner 146 via duct 125. The hot gas stream from the afterburner 146 is directed between the two walls of the curing station 66 via ducts 181. The heat in the gas stream heats the briquettes or pellets through the curing station shell. Briquettes or pellets transferred into the top of the curing station 66 are cured by the steam from the briquettes on the bottom, which are dried by exhaust gasses from duct 181. The curing station also serves as the storage silo for the furnace 80A. The exhaust gasses 181, thus cooled via heat transfer at the curing stations 66, are directed to the baghouse 189 via duct 183.

In baghouse 189, the reduced-temperature gases are treated to separate solids from exhaust gases. Recovered solids generally comprising marketable oxides from the volatilized zinc, cadmium, and lead, are stored at 111. The exhaust gases, now purified of offensive or hazardous components, are drawn upwardly by a fan 194 through stack 198 and exhausted into the environment or compressed for carbon dioxide production. Methods 10 and 11 thus provide complete recycling of waste products to produce marketable substances with minimal resulting waste. Complete reclamation of hazardous and/or valuable substances by the present process permits industry to minimize waste, fully exploit its available resources, and expand its markets.

EXAMPLE I

Organic binders containing cyanide were used to stabilize and harden the bricks used in various tests. Cyanide is found in two primary forms, water-soluble (free) and non-water soluble (fixed). Water-soluble cyanide reacts in this manner in water: $NaCN + H_2O \longleftrightarrow NaOH + HCN$.

At high pH the NaOH and HCN are in equilibrium. When the pH shifts toward acid, the HCN is released as a deadly gas that can be burned. HCN is also a very effective reducing agent as both the hydrogen and carbon are used to reduce metals. Non-water soluble cyanide salts are very stable up to 2,786° F. and can be directly used for a carbon source for any metal having a reduction point below this. When water soluble cyanide is in the crystalline form, the reactions are the same as with non-water soluble cyanide. Open air combustion or incineration results in the following reaction on sodium copper cyanide:

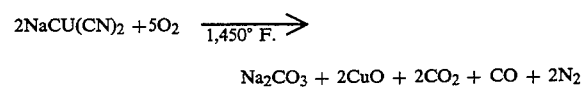

$2NaCU(CN)_2 + 5O_2 \xrightarrow{1,450° F.}$ $Na_2CO_3 + 2CuO + 2CO_2 + CO + 2N_2$

EXAMPLE II

Cyanide aids in the metal-reduction process. Importantly, no cyanide was detected in the slag or the metals after processing. Any cyanides present in the air stream in the form of hydrogen cyanide are destroyed in the afterburner and are not emitted. The reaction without oxygen within a briquette or pellet would be the following:

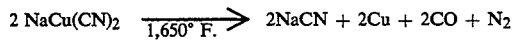

$$2\text{ NaCu(CN)}_2 \xrightarrow[1,650°\text{ F.}]{} 2\text{NaCN} + 2\text{Cu} + 2\text{CO} + \text{N}_2$$

This above reaction gives, by mole weight, two sodium molecules to be used as sodium oxide (a secondary flux) for the slag, two copper molecules, two CO gases for reduction of other metals and two cyanides for further reduction reaction. Carbon, the major reducing agent for the required reduction reactions, can come from many wastes or by products.

Activated carbon is used to remove hazardous materials from both air and water. The "spent" carbon then bears the hazardous waste code of the element or organic adsorbed/absorbed onto/into the carbon. This spent carbon can be cleaned and "reactivated" or disposed of into a hazardous waste landfill. If the carbon is used in a process it would be defined as "F," "D," or "K" wastes, such as K045 (spent carbon from the treatment of waste water containing explosives).

Many baghouse dusts contain large amounts of carbon and are not necessarily classified as a hazardous waste but have been used in this process as the reduction agents. These baghouse dusts contain other useful materials to the process including reducible metals, volatile metals, aluminum oxide, calcium oxide, silicon dioxide, etc.

EXAMPLE III

A test project underway in Vancouver, Washington blends electric arc furnace dust (K061) with spent aluminum potliner (K088). Zinc oxide and iron are extracted from the dust. Carbon in the potliner is the reductant. All other non-volatile elements are converted into fiber.

Non-volatile, fixed carbon can be used in any form. Cyanide is one form of such carbon. Cyanides, in most forms, have no fuel value, but are attached to either a fluxing agent such as sodium and calcium and/or reducible metals such as iron, zinc, cadmium, silver, copper, nickel, or a mixture of these elements.

The reactions are similar for all cyanide compounds. It is also known that certain cyanides are good binders for briquetting or when small amounts of other organics are present the reactions are enhanced.

EXAMPLE IV

Another source of carbon used in this process is spent aluminum potliner (SPL) from the primary aluminum industry. Although this material is hazardous because it contains cyanide that is in the same form as K007, F010, F011, and F012 and is the main problem in many F006, F007, F008, and F009 wastes, SPL carries the EPA ID of K088. SPL (K088) is one of the best agents to be used in this process because it contains fixed carbon and aluminum for reduction, alumina for slag modifier and two secondary fluxes, sodium and fluoride. The process for primary aluminum production varies, but all have common factors within the operation. A material known as hall bath or cryolite ($Na_2 AlF_6$ or $Na_3AlF_6$) is used as the reduction bath within a furnace (pot).

Electrodes made of carbon are inserted into the furnace from the top or carbon powder is floated on top of the cryolite to conduct electricity through the cryolite. The bottom and sides of the furnace are also lined with carbon to hold the cryolite and conduct electricity through the cryolite. Most plants use iron or steel plates to conduct electrical current into the carbon that lines the pot. Typically these are called collector bars. The pot has fire brick as an insulator between the inside of the pot (carbon) and the outside of the pot (steel). The carbon lining of the pot is called "first cut" material. The brick, vapor barrier and leveling agents are called "second cut."

As the pot is used, cryolite soaks into the carbon (first cut) down to the "vapor barrier." When cryolite contacts iron or steel sheets in the presence of air, cyanide is formed. The reaction between the nitrogen in the air and the carbon of the lining occurs as follows:

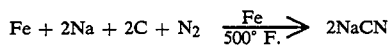

$$\text{Fe} + 2\text{Na} + 2\text{C} + \text{N}_2 \xrightarrow[500°\text{ F.}]{\text{Fe}} 2\text{NaCN}$$

Moisture in the air or the water used to soak the pot before the lining is removed can cause the following reaction around the collection bars, pot shell, and lining.

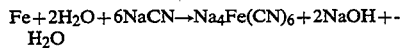

$$\text{Fe} + 2\text{H}_2\text{O} + 6\text{NaCN} \rightarrow \text{Na}_4\text{Fe(CN)}_6 + 2\text{NaOH} + \text{H}_2\text{O}$$

This chemical, known as yellow prussiate of soda, is used in blue-green inks and dies. When a pot is cleaned (dug), an inspection will reveal this highly stable hexacyanide as a bright yellow dust on the black carbon background. Typical first cut SPL would consist of the following:

TABLE 4

| Element | Content/Weight | Element | Content by Weight |
|---|---|---|---|
| Carbon | 45–65% | Potassium | 0.25–0.70% |
| Fluorine | 8–12% | Lithium | 0.3–0.25% |
| Sodium | 6–10% | Magnesium | 0.5–1.50% |
| Aluminum | 3–8% | Silicon | 2.5–4.50% |
| Nitrogen | <1% | Strontium | 0–0.25% |
| Calcium | 3–6% | Titanium | 0–0.25% |
| Iron | 0.5–1.2% | Sulphur | 0.1–0.30% |
| Cyanide | 0.03–0.2% | | |

The second cut material, primarily fire brick, typically has no hazardous materials contained within it. A typical analysis of the second cut would be as follows:

TABLE 5

| Element | Content/Weight | Element | Content/Weight |
|---|---|---|---|
| $SiO_2$ | 47–50% | $P_2O_5$ | 0.10–0.20% |
| $Al_2O_3$ | 28–52% | $Na_2O$ | 0.02–0.95% |
| $Fe_2O_3$ | 1–2.2% | $K_2O$ | 3.00–6.00% |
| Cao | 0–2% | Co | 0.03% |
| MgO | 0–0.3% | Cl | 5–15 PPM |
| $SO_3$ | 0.1–0.9% | F | 0.12–0.60% |
| $TiO_2$ | 0.25–1.25% | | |

The second cut material has been melted and spun directly into a high temperature fiber without smelting or additives to the process. The submerged or plasma arc furnace can be used for this process. When lime stone and small quantities of silica (sand) were added, a lower temperature mineral wool was created.

The SPL produced or buried on location at many primary aluminum producer's plants is mixed as first and second cuts and not easily separated. This material's carbon content could be as low as 13% or as high as 35% with grab sampling. The chemical content of mixed SPL varies little at a given producer's plant. A grab sample of the first cut and the second cut can be mathematically blended to show the total content of the pot. This is because the weight of mixed SPL results from about 50% in the first cut and about 50% in the second cut.

From this information, it can be seen that mixed SPL can replace F019 as the source of alumina, replace some of the silica in the formula, provide carbon and aluminum for reduction and provide two secondary fluxing agents.

First cut SPL (K088) was used in the pilot plant operation. Because of the percentage of zinc oxide, the ratio of carbon contained in the SPL was placed at 1 mole weight of carbon per mole weight of oxygen to be removed from the reducible metals. When zinc is not present the carbon consumption can be reduced.

The charge to fuel ratios are high on these tests because of three factors. First, the size of the shaft furnace, (18 inches. in diameter) is relatively small. It has a water cooled jacket that allows more than one-third of the heat to be lost. Second, the shaft of the furnace is only six feet high, that allows the gases to exit the furnace at 800° F. A longer shaft would have the exit gas temperature at 250° F. because more material could be preheated. The third factor is that the exhaust gases were not used to preheat the blast air into the furnace. If this last heat loss alone were corrected, the observed 1:1 charge-to-fuel ratio could have been improved to 3:1. Charge to fuel ratios are given to enhance the knowledge of the resulting slag being produced, not as an operational parameter. The coke used as fuel produces ash that is incorporated into the slag. If these tests were performed in a plasma assist cupola seventy-two inches in diameter, the charge-to-fuel ratio would become 70:1.

EXAMPLE V

Recovery of Zinc and Iron and Production Of Mineral Wool

The waste materials listed in Table 6 below are mixed into a homogeneous mass and molded into small briquettes. The briquettes are dried to a final moisture content of less than five percent by weight, and subsequently reduced in a shaft furnace at 2800° F. using coke at a 1:1 charge-to-fuel ratio. First cut K088 is used as a reducing agent at one mole of carbon per mole of oxygen to be removed.

TABLE 6

| EPA Des. | Waste Materials Used in Sample | | |
|---|---|---|---|
| | *Sub-Components | Percents of Total or Subtotal | |
| K061 | | | 63.1% |
| | CaO | 25.0% | |
| | Fe$_2$O$_3$ as Fe | 24.0% | |
| | ZnO as Zn | 22.0% | |
| | SiO$_2$ | 3.0% | |
| | MgO | 3.0% | |
| | PbO as Pb | 1.0% | |
| | Cr$_2$O$_3$ as Cr | 0.07% | |
| | CdO as Cd | 0.065% | |
| K062 (stabilized secure land fill material) | | | 19.42% |
| | Cao | 41.2% | |
| | SiO$_2$ | 13.1% | |
| | Organics | 4.61% | |
| | Fe$_2$O$_3$ as Fe | 4.47% | |
| | Al$_2$O$_3$ as Al | 1.7% | |

TABLE 6-continued

| EPA Des. | Waste Materials Used in Sample | | |
|---|---|---|---|
| | *Sub-Components | Percents of Total or Subtotal | |
| | Zn | 0.0197% | |
| | Ba | 0.00567% | |
| | Cu | 0.00549% | |
| | Pb | 0.00514% | |
| | Cr | 0.00375% | |
| | Ni | 0.00225% | |
| | As | 0.000792% | |
| | Hg | 0.000201% | |
| | Cd | 0.000171% | |
| F019 | | | 9.71% |
| | Al(OH)$_3$ | 74.0% | |
| | Ca(OH)$_2$ | 15.0% | |
| | Mg(OH)$_2$ | 10.4% | |
| New Silica Sand | | | 7.77% |
| | SiO$_2$ | 98.0% | |
| APPROX TOTAL: | | | 100.00% |

*Components are given by dry weight as measured at 101-Degrees Centigrade.

A typical sample of products resulting from one ton of dried briquettes passing through one cycle of the present process is shown in the following table:

TABLE 7

| Product | Yield from One Ton Sample | | |
|---|---|---|---|
| | *Sub-Components | Yield in Pounds | |
| Primary Alloy | | | 315.67 |
| | Fe | 314.45 | |
| | Cr | 0.63 | |
| | S | 0.56 | |
| | Cu | 0.02 | |
| | Ni | 0.01 | |
| Volatile Metals | | | 250.84 |
| | Zn | 249.94 | |
| | Pb | 0.78 | |
| | Cd | 0.12 | |
| Secondary Alloy (Pb) | | | 12.32 |
| Slag (Oxides) | | | 1,116.92 |
| | Ca | 504.65 | |
| | Si | 356.28 | |
| | Al | 152.16 | |
| | Mg | 57.55 | |
| | Fe | 16.77 | |
| | S | 12.11 | |
| | F | 9.84 | |
| | Na | 6.15 | |
| | Chlorides | 0.80 | |
| | Pb | 0.32 | |
| | Cr | 0.27 | |
| Mineral Wool from Slag | | | 838.00 |
| Shot | | | 279.00 |

The resulting Acid:Base ratio in the above Example is 0.92. Basicity is 1.11. All exhausts, heavy solids, and shot are recycled into the system, and no wastes result. Lead present as a secondary alloy readily separates from the iron in the molds and after cooling.

EXAMPLE VI

Recovery Of Iron and Zinc and Production of Mineral Wool

The wastes listed in Table 8 below are mixed into a homogeneous mass and molded into small briquettes. The briquettes are cured and subsequently reduced in a shaft furnace at 2900 degrees Fahrenheit. In this sample, fuel consumption is reduced by roughly one-half, due to the presence of aluminum in the waste. The aluminum contained in the casting sands and the sludge from the grinding and buffing operations help to reduce the iron and zinc while increasing the slag temperature and volatilizing the zinc.

TABLE 8

| Waste Materials Used in Sample | | |
|---|---|---|
| EPA Designation | *Components | Percent of Total |
| K061 | | |
| | CaO | 25% |
| | Fe$_2$O$_3$ as Fe | 24% |
| | ZnO as Zn | 22% |
| | SiO$_2$ | 3% |
| | MgO | 3% |
| | PbO as Pb | 1% |
| | Cr$_2$O$_3$ as Cr | 0.07% |
| | CdO as Cd | 0.065% |
| MOLDING SAND | | 10% |
| | SiO$_2$ | 93% |
| | Organic Binders | 3% |
| | Al$_2$O$_3$ | 2% |
| | Al | 1.66% |
| GRINDING/ BUFFING SLUDGE | | 20% |
| | Al | 41% |
| | Fibers | 33% |
| | SiO$_2$ | 20% |
| Approx total: | | 100.00% |

*Components are given by dry weight as measured at 101-Degrees Centigrade.

Products obtained from a representative one-ton sample of dried briquettes are as follows.

TABLE 9

| Yield from One-Ton Sample | | |
|---|---|---|
| Product | Sub-components | Pounds |
| Primary Alloy | | 336.86 |
| | Fe | 336.0 |
| | Cr | 0.86 |
| Volatile Metals | | 278.14 |
| | Zn | 277.2 |
| | Cd | 0.86 |
| | Pb | 0.08 |
| Secondary Alloy | Pb | 13.65 |
| Slag (Oxides) | | 948.61 |
| | Si | 361.73 |
| | Ca | 350.00 |
| | Al | 143.91 |
| | Mg | 42.0 |
| | Fe | 17.92 |
| | F | 10.92 |
| | S | 8.09 |
| | Na | 6.83 |
| | Inerts | 5.85 |
| | Chloride | 0.89 |
| | Pb | 0.35 |
| | Cr | 0.12 |
| Mineral Wool from Slag | | 711.00 |
| Shot | | 237.00 |
| Approx Subtotal: | | 948.00 |

The Acid:Base Ratio of the above Example is 1:33; basicity is 0.78. As in the first example, lead is present as a secondary alloy that readily separates from the iron in the molds and after cooling. Exhausts, heavy solids, and shot are recycled and no wastes result.

EXAMPLE VII

Recovery of Chrome, Zinc, Nickel, and Iron Alloy and Production of Mineral Wool

The wastes listed in Table 10 below are mixed into a homogeneous mass and formed into briquettes. The briquettes are then cured to a final moisture content of five percent. The briquettes contain one mole of carbon per mole of oxygen, and are reduced in a shaft furnace at 3100° F. using coke at a 2:1 charge-to-fuel ratio. Carbon is supplied by K088 material.

TABLE 10

| Waste Materials Used in Sample | | |
|---|---|---|
| EPA Designation | *Components | Percent of Charge |
| K061 | | 40.0% |
| | CaO | 25.0% |
| | Fe$_2$O$_3$ as Fe | 24.0% |
| | ZnO as Zn | 22.0% |
| | SiO$_2$ | 3.0% |
| | MgO | 3.0% |
| | PbO as Pb | 1.0% |
| | Cr$_2$O$_3$ as Cr | 0.07% |
| | CdO as Cd | 0.065% |
| F006 | | 31.0% |
| | Cr | 24.662% |
| | Ni | 15.559% |
| | Organics | 0.9% |
| | Fe | 8.44% |
| | CaO | 1.88% |
| | Zn | 1.193% |
| | Cu | 0.71% |
| | Mg | 0.6% |
| | Pb | 0.0272% |
| F019 | | 6.0% |
| | Al(OH)$_3$ | 74.0% |
| | Ca(OH)$_2$ | 15.0% |
| | Mg(OH)$_2$ | 10.4% |
| K062 (stabilized secure land fill material) | | 14.0% |
| | CaO | 41.2% |
| | SiO$_2$ | 13.1% |
| | Organics | 4.61% |
| | Fe$_2$O$_3$ as Fe | 4.47% |
| | Al$_2$O$_3$ as Al | 1.7% |
| | Zn | 0.0197% |
| | Ni | 0.00225% |
| | Ba | 0.00567% |
| | As | 0.000792% |
| | Cu | 0.00549% |
| | Hg | 0.000201% |
| | Pb | 0.00514% |
| | Cd | 0.000171% |
| | Cr | 0.00375% |

*Components are given on a dry weight basis as detected at 101-degrees Centigrade.

Products obtained in a representative sample of the process of Example 7 are listed in Table 11 below:

TABLE 11

| Yield from One-Ton Sample (pounds) | | |
|---|---|---|
| Product | Sub-components | Pounds |
| Primary Alloy | | 458.19 |
| | Fe | 252.67 |
| | Cr | 107.26 |
| | Ni | 94.06 |
| | Cu | 4.2 |
| Volatile Metals | | 165.616 |
| | Zn | 165.11 |
| | Cd | 0.50 |
| | Pb | 0.006 |
| Secondary Alloy | Pb | 7.98 |
| Slag (Oxides) | | 847.68 |
| | Ca | 345.02 |
| | Si | 290.82 |
| | Al | 94.73 |
| | Cr | 45.97 |
| | Mg | 39.89 |
| | Fe | 13.48 |
| | S | 6.92 |
| | F | 6.24 |
| | Na | 3.9 |
| | Cl | 0.51 |
| | Pb | 0.20 |
| Mineral Wool from Slag | | 636.00 |
| Shot | | 211.00 |
| Approx. Subtotal: | | 847.00 |

The resulting Acid:Base ratio was 0.92. Basicity is 1.11. Exhausts, heavy solids, and shot are recycled into the system, and no wastes result.

EXAMPLE VIII

Recovery of Cu and Production of Mineral Wool

The waste materials listed in Table 12 below are mixed and molded into briquettes. The briquettes are cured to a final moisture content of six percent, and reduced by the carbon in the air emission dust and grinding sludge at 2200° F. in a shaft furnace using coke at a 6:1 charge-to-fuel ratio.

TABLE 12

Waste Materials Used in Sample

| EPA Designation | *Components | | Percent of Total |
|---|---|---|---|
| F006 | | | 60.0% |
| | Cu | 30.01% | |
| | CaO | 23.0% | |
| | Zn | 4.2% | |
| | Cr | 0.0036% | |
| | Ni | 0.0036% | |
| | Ba | 0.0008% | |
| | As | 0.006% | |
| MOLDING SAND | | | 10.0% |
| | $SiO_2$ | 93.0% | |
| | Organic Binders | 3.0% | |
| | $Al_2O_3$ | 2.0% | |
| | Al | 1.66% | |
| AIR EMISSION DUST | | | 20.0% |
| | C | 50.0% | |
| | CaO | 21.0% | |
| | $Al_2O_3$ | 10.0% | |
| | $SiO_2$ | 6.0% | |
| | MgO | 3.1% | |
| | Fluorides | 0.3% | |
| GRINDING/ BUFFING SLUDGE | | | 10.0% |
| | Al | 41.0% | |
| | Fibers (carbonized) | 33.0% | |
| | $SiO_2$ | 20.0% | |

*Components are given on a dry weight basis as detected at 101-degrees Centigrade.

Table 13 below lists products obtained in a representative sample resulting from materials processed in Example VIII:

TABLE 13

Yield from One-Ton Sample

| Product | Sub-components | | Pounds |
|---|---|---|---|
| Primary Alloy | | | 342.08 |
| | Cu | 342.0 | |
| | Ni | 0.04 | |
| | Cr | 0.03 | |
| | As | 0.01 | |
| Volatile Metals | Zn | | 45.36 |
| Secondary Alloy | | | None |
| Slags from Oxides | | | 790.25 |
| | Ca | 360.00 | |
| | Si | 274.46 | |
| | Al | 114.17 | |
| | Inerts | 25.35 | |
| | Mg | 12.40 | |
| | S | 2.68 | |
| | F | 1.17 | |
| | Ba | 0.01 | |
| | Cr | 0.01 | |
| Mineral Wool from Slag | | 592 | |
| Shot | | 197 | |

The resulting Acid:Base ratio is 1.11. Basicity is 0.96. Exhausts, heavy solids, and shot are recycled into the system, and no wastes result.

From the foregoing, it will be seen that this invention is one well adapted to obtain all the ends and objects herein set forth, together with other advantages that are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A process for recycling hazardous and non-hazardous wastes comprising the steps of:
    (a) collecting waste metal oxides to be reduced, said metal oxides selected from the group consisting of oxides of iron, chromium, copper, nickel, zinc, lead and cadmium;
    (b) collecting waste to be used as reducing agents, the reducing agents selected from the group consisting of fixed carbon and aluminum;
    (c) collecting waste to be used as primary fluxing agents, the fluxing agents selected from the group consisting of calcium oxide, calcium hydroxides, and silica dioxide;
    (d) blending the wastes of steps (a)–(c) with at least one liquid into a homogeneous mass;
    (e) forming the mass of step (d) into briquettes or pellets;
    (f) curing and drying the briquettes or pellets of step (e); and,
    (g) heating and melting the briquettes or pellets of step (e) thereby reducing the iron, chromium, copper, lead, and nickel of said wastes of step (a) with said wastes of step (b) to a metallic state suitable for release.

2. The process as defined in claim 1 wherein execution of said step (g) reduces zinc of step (a) to a volatile state.

3. The process as defined in claim 2 wherein execution of said step (g) volatilizes cadmium oxides.

4. The process as defined in claim 3 wherein execution of said step (g) produces slag with the remaining non-reducible and non-volatile metal oxides contained in said waste of steps (a)–(c).

5. The process as defined in claim 4 wherein the temperature during step (g) is approximately 3100 degrees Fahrenheit.

6. The process as defined in claim 4 further comprising the steps of:
    (h) drawing off the slag of step (g) and forming said slag into mineral wool and shot; and,
    (i) recycling said shot.

7. The process as defined in claim 4 further comprising the steps of:
    (j) drawing off gases resulting from step (g);
    (k) mixing the gases and particles smaller than ten microns of step (h) with air and natural gas to form a mixture, and then burning the mixture in an afterburner; and,
    (l) cooling the mixture of step (k) and separating it into resultant volatile metal oxides of zinc, lead, cadmium and non-hazardous gaseous wastes.

8. The process as defined in claim 7 including the step of curing and drying the briquettes or pellets of step (e) to a moisture content of about five percent.

9. The process as defined in claim 7 including the step of charging a furnace with the briquettes or pellets of step (e) and coke in a 2:1 charge to fuel ratio or less.

10. The process as defined in claim 1 including the step of:
(m) collecting a quantity of waste to be used as secondary fluxing agents, said secondary fluxing agents selected from the group consisting of residues of sodium and fluorides; and,
(n) adding said last mentioned waste to said pelletizing step to lower the viscosity of the resultant slag in the furnace from the primary fluxing agents to enhance the fall of reduced metals to the bottom of the furnace and to clean the furnace walls.

11. The process as defined in claim 1 including the steps of:
(o) collecting a quantity of waste to be used as slag modifiers, said slag modifiers selected from the group consisting of alumina, zirconia, titanium and chromium; and,
(p) reacting said last mentioned waste in said furnace to reinforce the bonds in resultant calcium silicate slags to enhance the drawing of fiber.

12. A combination process for recycling hazardous and non-hazardous wastes comprising the steps of:
(a) collecting waste metal oxides to be reduced, said metal oxides selected from the group consisting of oxides of iron, chromium, copper, nickel, zinc, lead and cadmium;
(b) collecting waste to be used as reducing agents, the reducing agents selected from the group consisting of fixed carbon and aluminum;
(c) collecting waste to be used as primary fluxing agents, the fluxing agents selected from the group consisting of calcium oxide, calcium hydroxides, and silica dioxide;
(d) blending the wastes of steps (a)-(c) with at least one liquid into a homogeneous mass;
(e) forming the mass of step (d) into briquettes or pellets;
(f) curing and drying the briquettes or pellets of step (e); and,
(g) heating the briquettes or pellets of step (f) to approximately 3100 degrees Fahrenheit thereby:
(g)(1) reducing the iron, chromium, copper, lead, and nickel of said wastes of step (a) with said wastes of step (b) to a metallic state;
(g)(2) reducing zinc of step (a) to a volatile state;
(g)(3) volatilizing cadmium oxides;
(g)(4) melting the briquettes or pellets to release the metals of step (g)(1) and produce slag with the remaining nonreducible and non-volatile metal oxides contained in said waste of steps (a)-(c).

13. The process as defined in claim 12 further comprising the steps of:
(h) drawing off the slag of step (g)(4) and forming said slag into mineral wool and shot; and,
(i) recycling said shot.

14. The process as defined in claim 13 further comprising the steps of:
(j) drawing off gases produced during said step (g);
(k) mixing the gases and particles of said slag smaller than ten microns of step (h) with air and natural gas to form a mixture, and then burning the mixture in an afterburner; and,
(l) cooling the mixture of step (k) and separating it into resultant volatile metal oxides of zinc, lead, cadmium and non-hazardous gaseous wastes.

15. The process as defined in claim 14 including the further step of curing and drying the briquettes or pellets of step (e) to a moisture content of less than five percent.

16. The process as defined in claim 14 including the further step of charging a furnace with the briquettes or pellets of step (e) and coke in a 2:1 charge-to-fuel ratio or less.

17. The process as defined in claim 14 including the further steps of:
(m) collecting a quantity of waste to be used as secondary fluxing agents, said secondary fluxing agents selected from the group consisting of comprising residues of sodium and fluorides; and,
(n) adding said last mentioned waste to said pelletizing step to lower the viscosity of the resultant slag in the furnace from the primary fluxing agents to enhance the fall of reduced metals to the bottom of the furnace and clean the furnace walls.

18. The process as defined in claim 17 including the steps of:
(o) collecting a quantity of waste to be used as slag modifiers, said slag modifiers selected from the group consisting of alumina, zirconia, titanium and chromium; and,
(p) reacting said last mentioned waste of said step (o) in said furnace to reinforce the bonds in resultant calcium silicate slags and thereby enhance the drawing of fiber.

19. The process as defined in claim 18 including the further step of curing and drying the briquettes or pellets of step (e) to a moisture content of about five percent.

20. The process as defined in claim 19 including the further step of charging a furnace with the briquettes or pellets of step (e) and coke in a 2:1 charge-to-fuel ratio or less.

* * * * *